(12) United States Patent
Hua et al.

(10) Patent No.: US 9,927,834 B2
(45) Date of Patent: Mar. 27, 2018

(54) RETENTION ASSEMBLY (71) Applicant: HEWLETT PACKARD ENTERPRISE DEVELOPMENT LP, Houston, TX (US)

(72) Inventors: Chanh V Hua, Houston, TX (US); Michael Sterns, Cypress, TX (US); Kevin D Conn, Montgomery, TX (US); Pinche Tsai, Richardson, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/317,116

(22) PCT Filed: Jul. 30, 2014

(86) PCT No.: PCT/US2014/048988
§ 371 (c)(1),
(2) Date: Dec. 8, 2016

(87) PCT Pub. No.: WO2016/018326
PCT Pub. Date: Feb. 4, 2016

(65) Prior Publication Data
US 2017/0108891 A1    Apr. 20, 2017

(51) Int. Cl.
*G06F 1/16*    (2006.01)
*H01R 12/75*   (2011.01)
*H01R 12/72*   (2011.01)

(52) U.S. Cl.
CPC ............. *G06F 1/16* (2013.01); *H01R 12/721* (2013.01)

(58) Field of Classification Search
None
See application file for complete search history.

(56) References Cited

U.S. PATENT DOCUMENTS

| 5,268,820 | A  | * | 12/1993 | Tseng | .............. | H05K 1/141 |
| | | | | | | 361/760 |
| 6,498,729 | B2 | | 12/2002 | Wong | | |
| 6,527,576 | B1 | * | 3/2003  | Omote | .............. | H01R 12/83 |
| | | | | | | 439/326 |

(Continued)

FOREIGN PATENT DOCUMENTS

TW    201311103    3/2013

OTHER PUBLICATIONS

PCT/ISA/KR, International Search Report, dated Mar. 31, 2015, PCT/US2014/048988, 11 pps.

(Continued)

*Primary Examiner* — Xanthia C Cunningham
(74) *Attorney, Agent, or Firm* — Hewlett Packard Enterprise Patent Department (57) ABSTRACT

Example implementations relate to a retention assembly. One example retention assembly includes a support member extending from a printed circuit board. The support member includes a body region having a slot and a first flange extending from the body region. The retention assembly also includes a locking member slidably coupled to the support member via the slot. The locking member includes a second flange. The second flange includes a protruded region, and wherein the protruded region and the first flange are to secure a proximal end of expansion module.

14 Claims, 12 Drawing Sheets

(56) References Cited

U.S. PATENT DOCUMENTS

| | | | | |
|---|---|---|---|---|
| 6,625,041 | B1* | 9/2003 | Chen | H05K 5/0286 24/293 |
| 6,896,539 | B2* | 5/2005 | Dobbs | H05K 1/144 361/802 |
| 7,077,678 | B1* | 7/2006 | Korsunsky | H01R 12/7005 439/326 |
| 7,114,974 | B2* | 10/2006 | Korsunsky | H05K 7/1404 361/758 |
| 7,134,895 | B1* | 11/2006 | Choy | H05K 7/1404 439/326 |
| 7,134,896 | B1* | 11/2006 | Chen | H05K 7/1404 439/326 |
| 7,182,618 | B1* | 2/2007 | Choy | H05K 7/1404 439/108 |
| 7,241,159 | B1* | 7/2007 | Chen | H01R 13/26 439/326 |
| 7,300,298 | B2* | 11/2007 | Kameda | H05K 7/1417 439/326 |
| 7,307,856 | B2* | 12/2007 | Dingfelder | H05K 7/1407 361/726 |
| 7,335,032 | B1* | 2/2008 | Lee | G06F 1/185 439/76.1 |
| 7,467,963 | B2* | 12/2008 | Chen | H01R 13/631 439/327 |
| 7,470,136 | B2* | 12/2008 | Yahiro | H01R 13/6275 439/326 |
| 7,554,816 | B2* | 6/2009 | Chang | H05K 7/1417 361/759 |
| 7,563,119 | B2* | 7/2009 | Hsu | H05K 7/12 439/326 |
| 7,649,750 | B2* | 1/2010 | Lee | H05K 7/1405 361/732 |
| 7,717,727 | B2* | 5/2010 | Li | H01R 13/648 439/328 |
| 8,130,489 | B2* | 3/2012 | Chan | G06F 1/185 361/679.31 |
| 8,477,488 | B2 | 7/2013 | Aldridge | |
| 8,500,457 | B2* | 8/2013 | Sun | H01R 12/73 439/65 |
| 8,579,645 | B2* | 11/2013 | Wang | H01R 12/73 439/326 |
| 8,628,337 | B2* | 1/2014 | Sun | H01R 13/639 439/74 |
| 8,657,619 | B2* | 2/2014 | Lin | G06F 1/185 439/326 |
| 8,873,240 | B2* | 10/2014 | Jimenez, III | G06F 1/185 361/730 |
| 9,136,621 | B1* | 9/2015 | Jaskela | H01R 12/7029 |
| 2003/0227761 | A1* | 12/2003 | Liao | G06F 1/184 361/801 |
| 2004/0152353 | A1* | 8/2004 | Kawamae | H01R 12/721 439/328 |
| 2005/0048828 | A1* | 3/2005 | Ho | H01R 12/721 439/326 |
| 2005/0112927 | A1* | 5/2005 | Wang | G06K 7/0013 439/326 |
| 2005/0255734 | A1* | 11/2005 | Liu | H05K 7/1405 439/326 |
| 2006/0189196 | A1* | 8/2006 | Kameda | H01R 12/83 439/326 |
| 2007/0032116 | A1* | 2/2007 | Liang | H01R 12/7029 439/326 |
| 2007/0076399 | A1* | 4/2007 | Barina | G06F 1/185 361/801 |
| 2007/0105425 | A1* | 5/2007 | Wang | H05K 7/142 439/326 |
| 2007/0115646 | A1* | 5/2007 | Wu | H05K 7/1431 361/747 |
| 2007/0202732 | A1* | 8/2007 | Yahiro | H01R 13/6275 439/326 |
| 2008/0137311 | A1* | 6/2008 | Yang | G06F 1/185 361/732 |
| 2009/0017664 | A1* | 1/2009 | McAlonis | H05K 1/142 439/326 |
| 2010/0062624 | A1* | 3/2010 | Tsai | H05K 7/16 439/74 |
| 2010/0128447 | A1* | 5/2010 | MacDougall | G11C 5/04 361/737 |
| 2010/0188828 | A1* | 7/2010 | Takao | G06F 1/1613 361/759 |
| 2011/0122569 | A1 | 5/2011 | Chang | |
| 2012/0064737 | A1* | 3/2012 | Sass | H01R 12/721 439/65 |
| 2013/0048814 | A1 | 2/2013 | Zhou | |
| 2013/0050937 | A1 | 2/2013 | Zhou | |
| 2013/0058054 | A1* | 3/2013 | Zhou | G06F 1/185 361/748 |
| 2013/0288532 | A1 | 10/2013 | Lai | |
| 2014/0211403 | A1* | 7/2014 | Ma | G06F 1/185 361/679.32 |

OTHER PUBLICATIONS

Taiwanese Office Action cited in Appl. No. 104122723 dated Aug. 27, 2017; 5 pages.

* cited by examiner

RETENTION ASSEMBLY

BACKGROUND

Expansion modules may be used to add build-to-order or configure-to-order features to a computing device, such as a laptop computer, during a manufacturing process of the computing device. For example, a Wi-Fi module may be an internally mounted expansion module added to a computing device.

BRIEF DESCRIPTION OF THE DRAWINGS

Some examples of the present application are described with respect to the following figures.

DETAILED DESCRIPTION

As described above, expansion modules may be used to add build-to-order or configure-to-order features to a computing device, such as a laptop computer, during a manufacturing process of the computing device. An expansion module may include a connector on one end of the expansion module for interfacing with other components of the computing device. The expansion module may plug into an expansion slot on a printed circuit board that houses components of the computing device using the connector.

When the expansion module is plugged in, the other end of the expansion module may be secured to the printed circuit board via a mounting screw. To receive a mounting screw, a nut may be mounted to the printed circuit board using a mounting hole. However, the mounting hole reduces the available signal routing path on the printed circuit board.

Examples described herein reduce the loss of available routing paths on the printed circuit board as compared to using a screw to secure an expansion module by providing a retention assembly that extends from a surface of the printed circuit board. For example, a retention assembly may include a support member extending from a printed circuit board and a locking member slidably coupled to the support member. The support member may be secured to a printed circuit board via soldering. The support member may include a first flange extending from a body region of the support member. The locking member may include a second flange. The locking member may change from an open position to a locked position by sliding via a slot in the body region of the support member. When at the locked position, the first flange and the second flange may secure a proximal end of an expansion module.

As another example, a retention assembly may include a support member extending from a printed circuit board and a locking member coupled to the support member. The locking member may include an upper flange and a lower flange. The locking member may change from an open position to a locked position via rotation relative to the support member. The upper flange and the lower flange may secure a proximal end of an expansion module when the locking member is at the locked position. In this manner, examples described herein may reduce the loss of available signal routing paths on a printed circuit board that hosts the expansion module.

Figure 1:
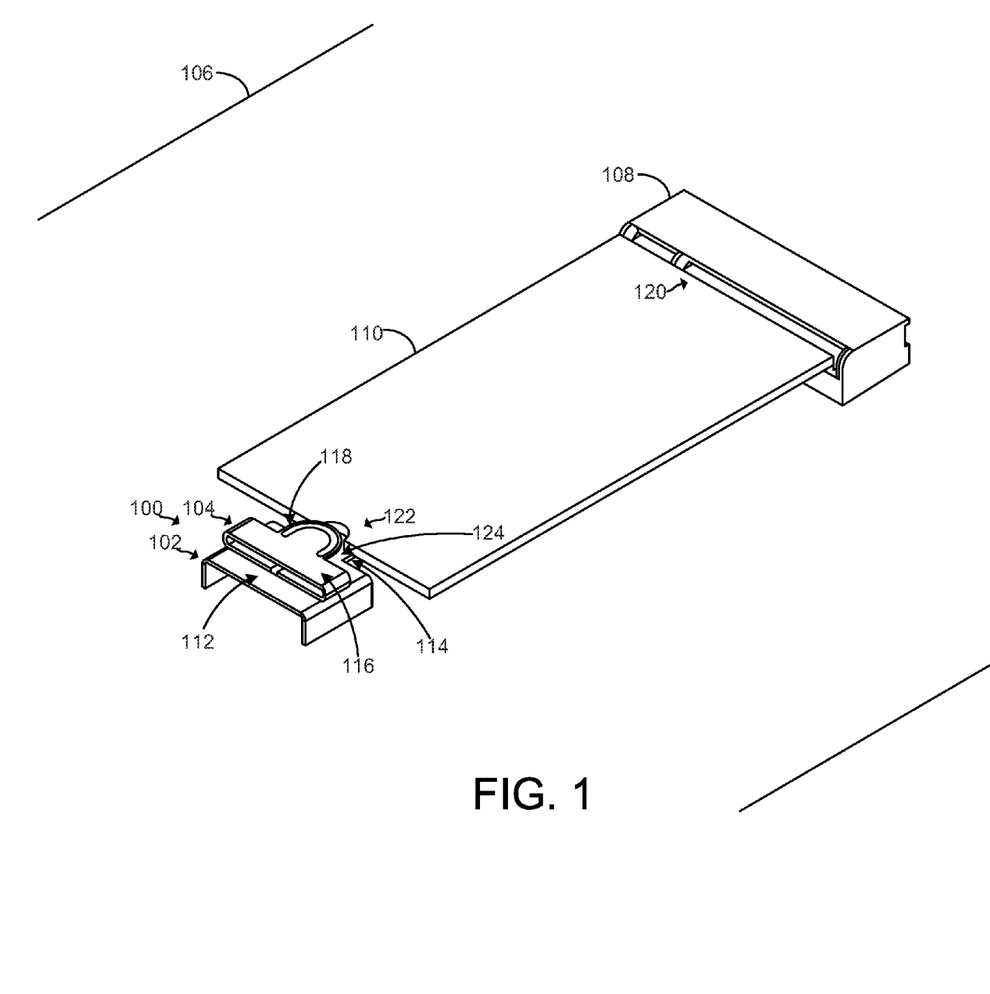
FIG. 1 is a side view of a retention assembly to secure an expansion module with a locking member at an open position, according to an example.

Referring now to the figures, FIG. 1 is a side view of a retention assembly 100 to secure an expansion module with a locking member at an open position, according to an example. Retention assembly 100 may be a mechanism to fasten or stabilize one end of an expansion module. Retention assembly 100 may include a support member 102 and a locking member 104.

Support member 102 may extend from a printed circuit board 106 that hosts an expansion slot 108 for receiving an expansion module 110. Printed circuit board 106 may host components of a computing device. Expansion slot 108 may be any type of connector or slot that is used to interface with an expansion module. For example, expansion slot 108 may be compliant with the M.2 form factor. Expansion module 110 may be any electronic device that is connected to a computing device via an expansion slot. For example, expansion module 110 may be a Wi-Fi module, a satellite navigation module, etc. Expansion module 110 may be compliant with the M.2 form factor. A distal end 120 of expansion module 110 may be plugged into expansion slot 108 so that expansion module 110 may interface with other components hosted on printed circuit board 106.

Support member 102 may be coupled to printed circuit board 106 via through-hole soldering. Support member 102 may include a first body region 112 and a first flange 114 extending from first body region 112. In some examples, first body region 112 may be a U-shaped structure. In some examples, first body region 112 may be made from metal so that first body region 112 may act as a grounding path for expansion module 110. When expansion module 110 is plugged into expansion slot 108, a region of a proximal end 122 of expansion module 110 may rest on an upper surface 124 of first flange 114. Upper surface 124 may be substantially flat. As used herein, substantially flat may mean that a height variation of the upper surface is in the range of +/−0.003 inch or 0.00762 centimeter.

Locking member 104 may be slidably coupled to support member 102 via a slot (not shown in FIG. 1) in first body region 112. Locking member 104 may include a second body region 116 and a second flange 118 extending from second body region 116. When at an opening position as illustrated in FIG. 1, second flange 118 may not be in physical contact with proximal end 122. To secure proximal end 122 of expansion module 110, locking member 104 may move from the open position to a locked position by sliding towards proximal end 122. At the locked position, a protrude region (not shown in FIG. 1) of second flange 118 and first flange 114 may secure proximal end 122. The protrude region of second flange 118 is described in more detail with reference to FIG. 2.

Figure 2:
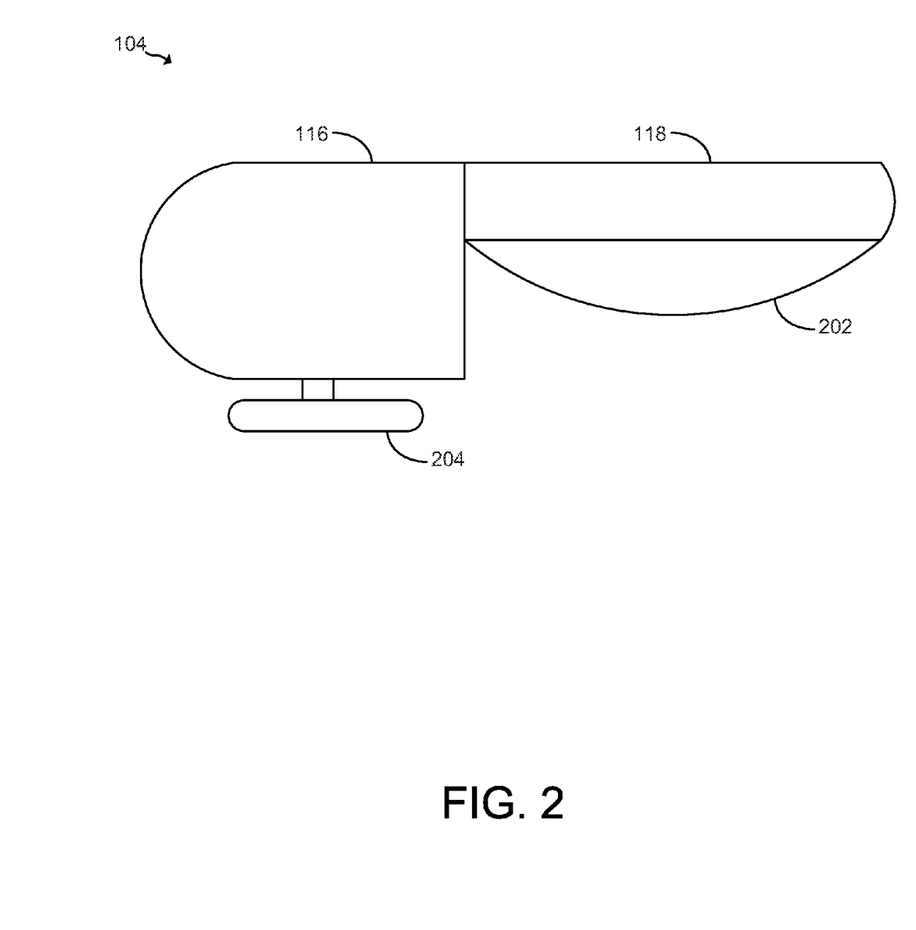
FIG. 2 is a side profile view of the locking member of the retention assembly of FIG. 1, according to an example.

FIG. 2 is a side profile view of locking member 104 of FIG. 1, according to an example. As illustrated in FIG. 2, second flange 118 may include a protruded region 202. Protruded region 202 may be in physical contact with a region of proximal end 122 of expansion module 110 when locking member 104 is at the locked position. Locking member 104 may include a connection region 204 that enables locking member 104 to be slidably coupled to support member 102. In some examples, region of second flange 118 that is in physical contact with proximal end 122 may be substantially flat instead of being protruded. In some examples, protruded region 202 may have a particular height such that when protruded region 202 is in physical contact with proximal end 122, protruded region 202 may apply pressure on proximal end 122 to reduce a likelihood of locking member 104 accidentally moving back to the open position. It should be understood that other mechanisms may be used to reduce the likelihood of locking member 104 accidentally moving back to the open position.

Figure 3:
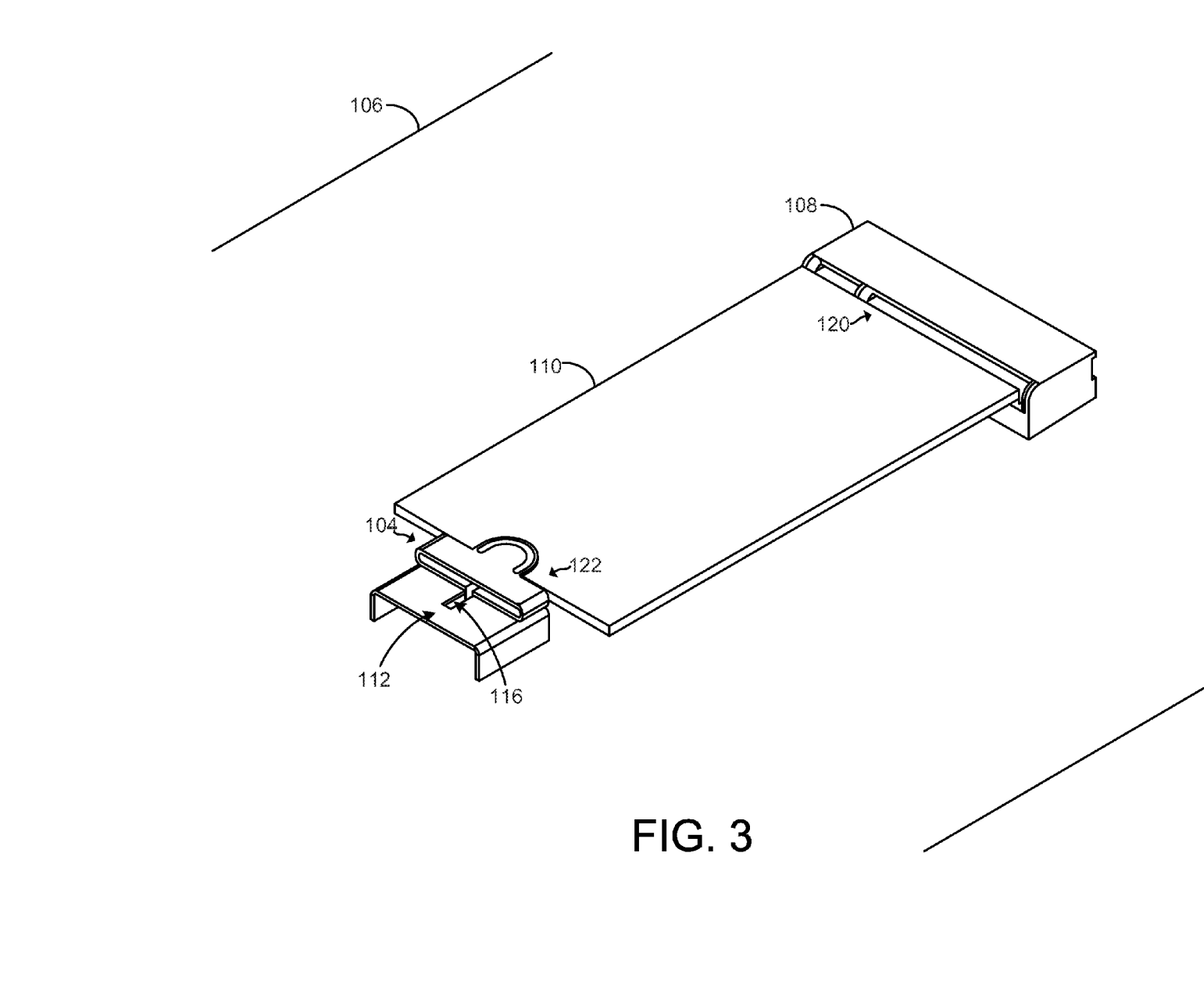
FIG. 3 is a side view of the retention assembly of FIG. 1 with the locking member at a locked position, according to an example.

FIG. 3 is a side view of retention assembly 100 of FIG. 1 with locking member 104 at a locked position, according to an example. During operation, locking member 104 may change from the open position to the locked position by sliding towards proximal end 122 of expansion module 110 via a slot 116 of first body region 112. At the locked position, protruded region 202 (not shown in FIG. 3) and upper surface 124 (not shown in FIG. 3) may secure proximal end 122.

Figure 4:
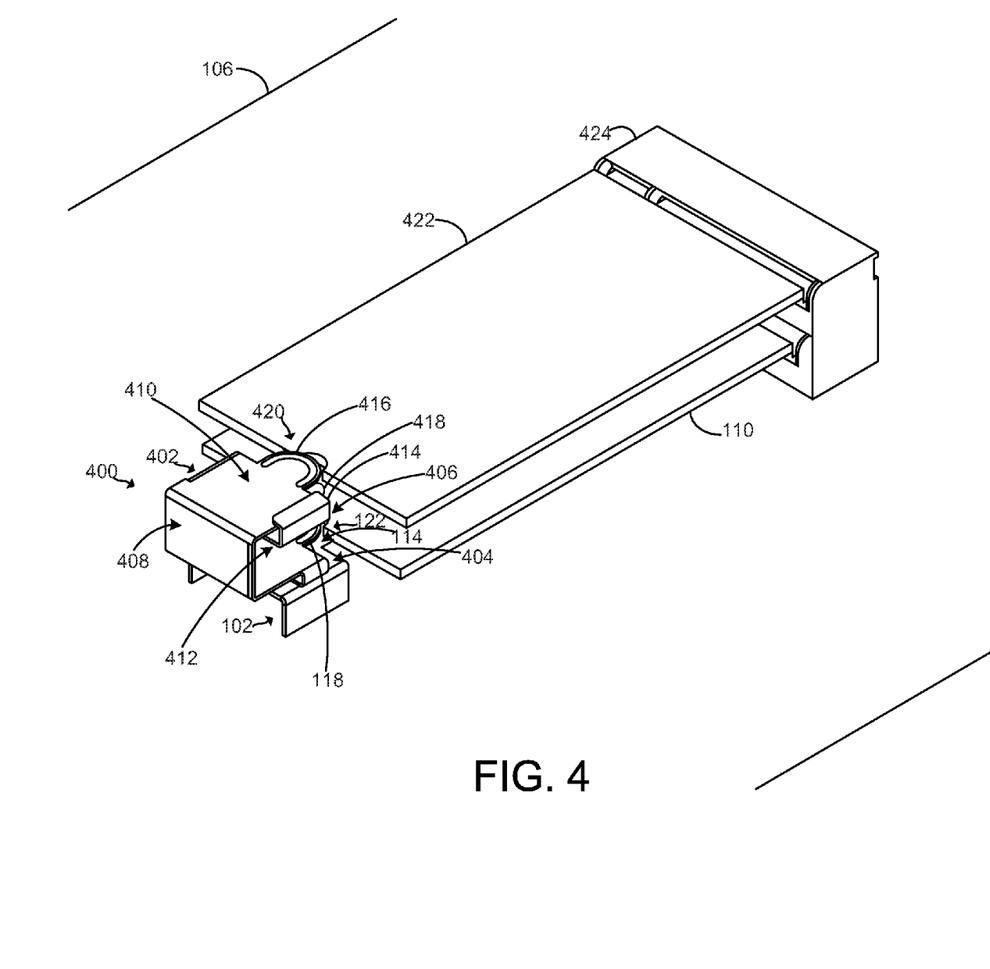
FIG. 4 is a side of view of a retention assembly to secure multiple stacked expansion modules with locking members at an open position, according to an example.

FIG. 4 is a side of view of a retention assembly 400 to secure multiple stacked expansion modules at an open position, according to an example. As illustrated in FIG. 4, expansion module 110 and a second expansion module 422 may be connected to an expansion slot 424 in a double stacked configuration (i.e., expansion module 110 and second expansion module 422 may be aligned in a parallel manner). Retention assembly 400 may be used to secure expansion modules 110 and 422.

Retention assembly 400 may include support member 102 and a locking member 402. Locking member 402 may be slidably coupled to support member 102 similar to the manner in which locking member 104 is coupled to support member 102. Locking member 402 may include a lower locking member 404 and an upper locking member 406. Lower locking member 404 may be similar to locking member 104. Lower locking member 404 may be coupled to upper locking member 406 via a connection region 408. In some examples, lower locking member 404 and upper locking member 406 may be integrally formed. Lower locking member 404 may be similar to locking member 104 of FIG. 1. Lower locking member 404 may include second flange 118. In some examples, lower locking member 404 and upper locking member 406 may be formed separately and then coupled together via soldering.

Upper locking member 406 may include a third body region 410 and a fourth body region 412. Third body region 410 may be coupled to fourth body region 412 via a lip region 414. Lip region 414 may partially overlap with a region of third body region 410 to increase structural rigidity of fourth body region 412. Third body region 410 may include a third flange 416 and fourth body region 412 may include a fourth flange 418. Third flange 416 may be similar to second flange 118 and fourth flange 418 may be similar to first flange 114. Flanges 114, 118, 416, and 418 may be in a parallel configuration to secure respective proximal ends 122 and 420 of expansion modules 110 and 422. Thus, during operation, locking member 402 may move from an open position to a locked position to secure proximal end 122 via first flange 114 and second flange 118 and to secure proximal end 420 of second expansion module 422 via third flange 416 and fourth flange 418.

Figure 5:
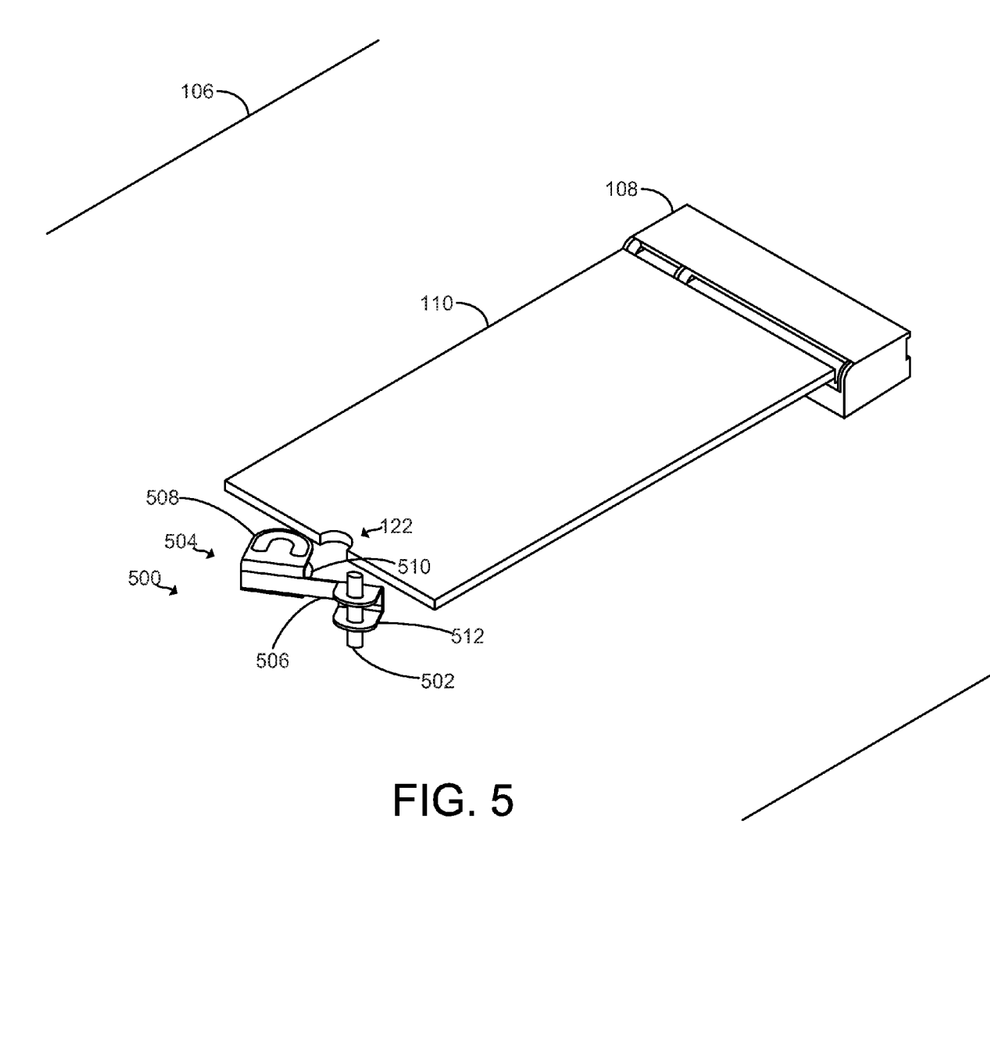
FIG. 5 is a side view of a retention assembly to secure an expansion module with a locking member at an open position, according to an example.

FIG. 5 is a side view of a retention assembly 500 to secure an expansion module with a locking member at an open position, according to an example. Retention assembly 500 may include a support member 502 and a locking member 504. Support member 502 may extend from printed circuit board 106 that hosts expansion slot 108 for receiving expansion module 110. Support member 502 may be coupled to printed circuit board 106 via soldering.

Locking member 504 may include a body region 506, an upper flange 508, a lower flange 510, and a connection region 512. Flanges 508-510 and connection region 512 may extend from different parts of body region 506. Locking member 504 may be rotatably coupled to support member 502 via connection region 512. For example, connection region 512 may include through-holes that match a diameter of support member 502 so that locking member 504 may be coupled to support member 502. In some examples, upper flange 508 and lower flange 510 may extend from different parts of body region 506 such that upper flange 508 and lower flange 510 are in a parallel configuration. In some examples, locking member 504 may be made from metal so that locking member 504 may act as a grounding path for expansion module 110.

During operation, locking member 504 may transition from an open position to a locked position to secure proximal end 122 of expansion module 110 via respective protruded regions (not shown in FIG. 5) of flanges 508-510. The respective protruded regions are described in more detail with reference to FIG. 6. As illustrated in FIG. 5, locking member 504 may be at the open position. At the opening position, flanges 508-510 may not be in physical contact with proximal end 122 of expansion module 110. Locking member 504 at the locked position is described in more detail with reference to FIG. 7.

Figure 6:
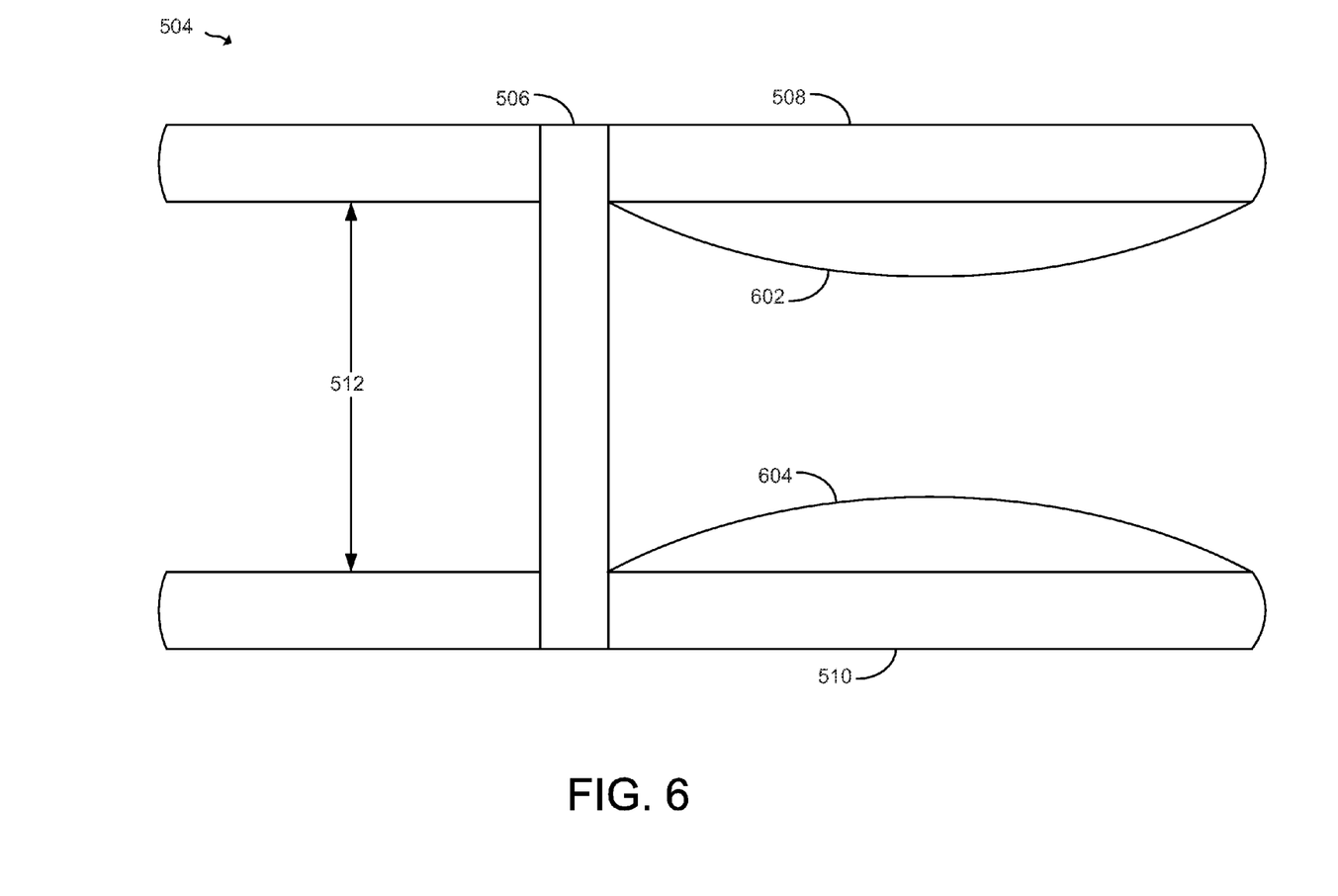
FIG. 6 a side profile view of the locking member of FIG. 5, according to an example.

FIG. 6 a side profile view of locking member 504 of FIG. 5, according to an example. As illustrated in FIG. 6, upper flange 508 may include a first protruded region 602 and lower flange 510 may include a second protruded region 604. During operation, first protruded region 602 may be in physical contact with a first surface of proximal end 122 of expansion module 110 and second protruded region 604 may be in physical contact with a second surface of proximal end 122. Thus, protruded regions 602-604 may secure proximal end 122. In some examples, protruded regions 602-604 may have a particular height such that when protruded regions 602-604 are in physical contact with proximal end 122, protruded regions 602 and/or 604 may apply pressure on proximal end 122 to reduce a likelihood of locking member 504 accidentally moving back to the open position. In some examples, regions of flanges 508-510 that are in physical contact with proximal end 122 may be substantially flat instead of being protruded.

Figure 7:
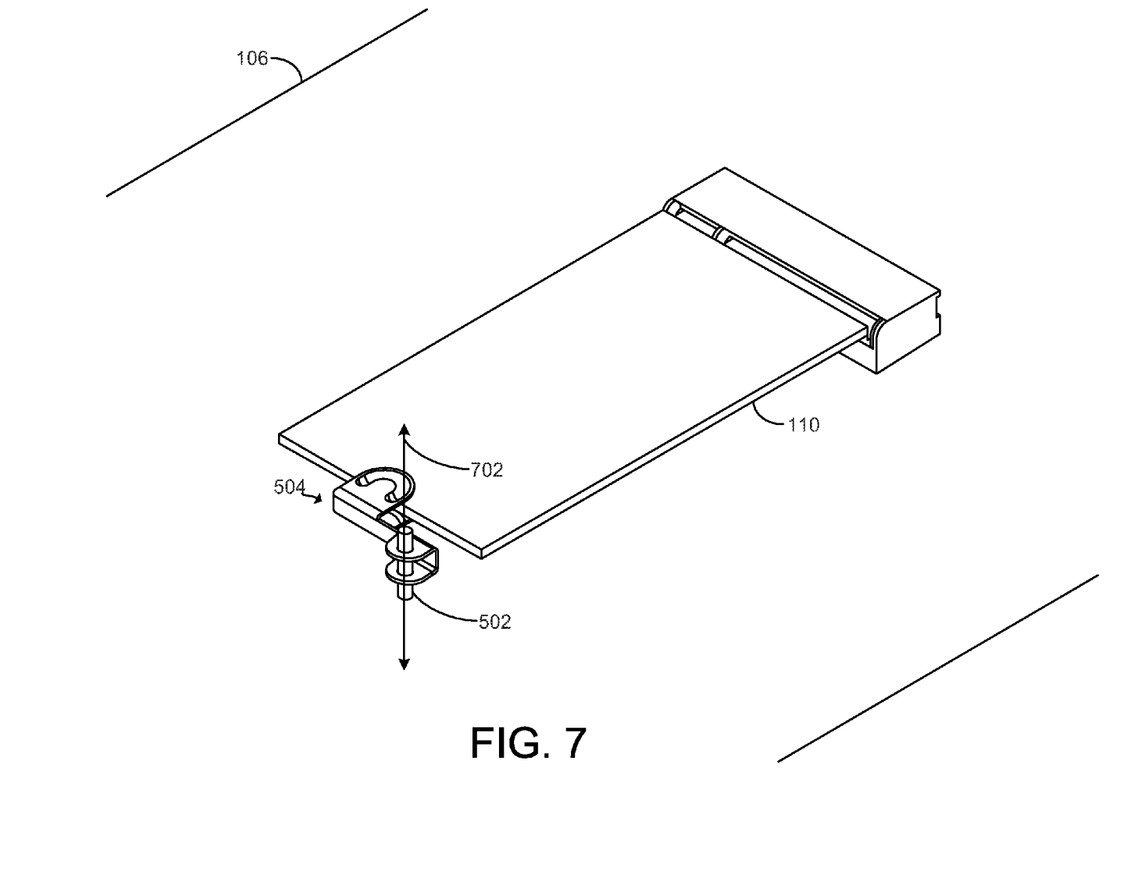
FIG. 7 is a side view of the retention assembly of FIG. 5 with the locking member at a locked position, according to an example.

FIG. 7 is a side view of retention assembly 500 of FIG. 5 with locking member 504 at a locked position, according to an example. During operation, locking member 504 may change from the open position to the locked position by rotating along support member 502 with respect to an axis of rotation 702 that is perpendicular to locking member 504. At the locked position, protruded regions 602 and 604 (not shown in FIG. 7) may secure proximal end 122.

Figure 8:
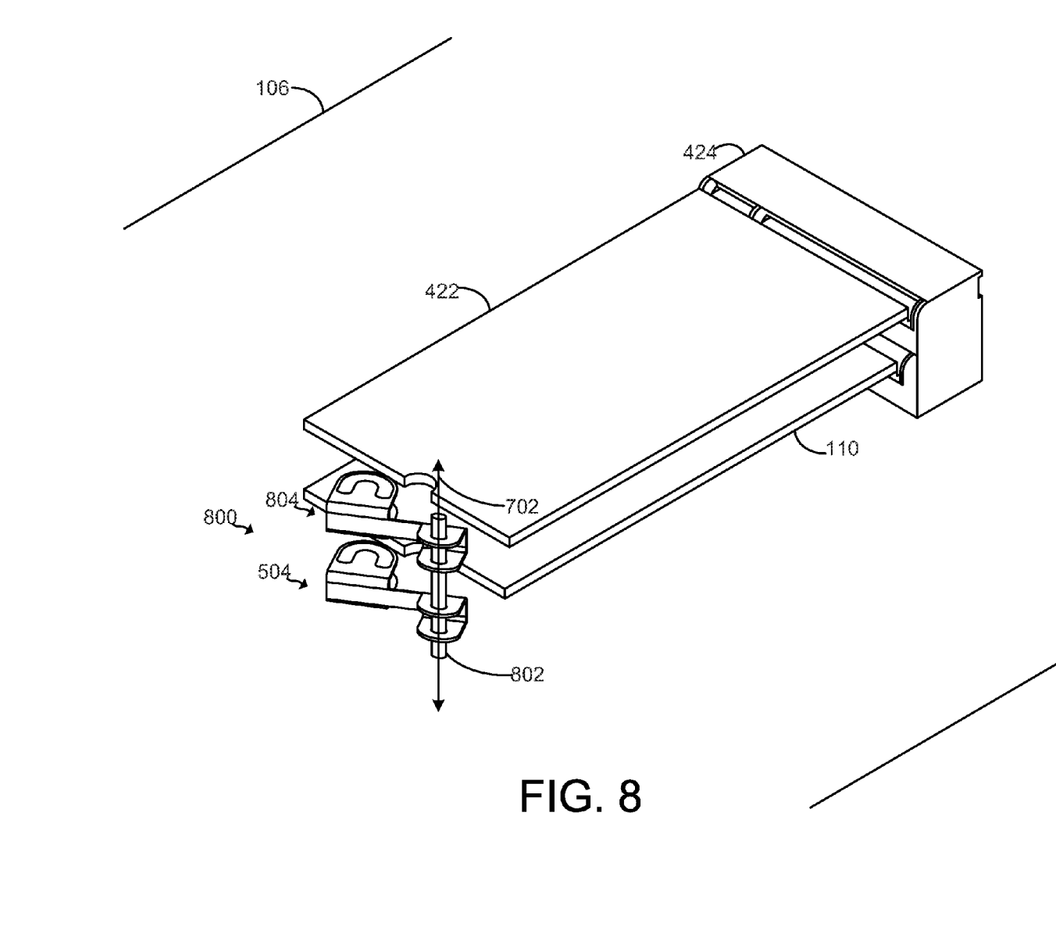
FIG. 8 is a side of view of a retention assembly to secure multiple stacked expansion modules with locking members at an open position, according to an example.

FIG. 8 is a side of view of a retention assembly 800 to secure multiple stacked expansion modules with locking members at an open position, according to an example. Retention assembly 800 may include a support member 802, locking member 504, and a second locking member 804. Support member 802 may be similar to support member 502 of FIG. 5. However, support member 802 may have a greater length than support member 502. Second locking member 804 may be similar to locking member 504. Retention assembly 800 may operate in a similar manner as retention assembly 500. However, retention assembly 800 may secure multiple expansion modules, such as expansion modules 110 and 422, using locking members 504 and 804, respectively. Locking members 504 and 804 may rotate with respect to axis of rotation 702.

Figure 9:
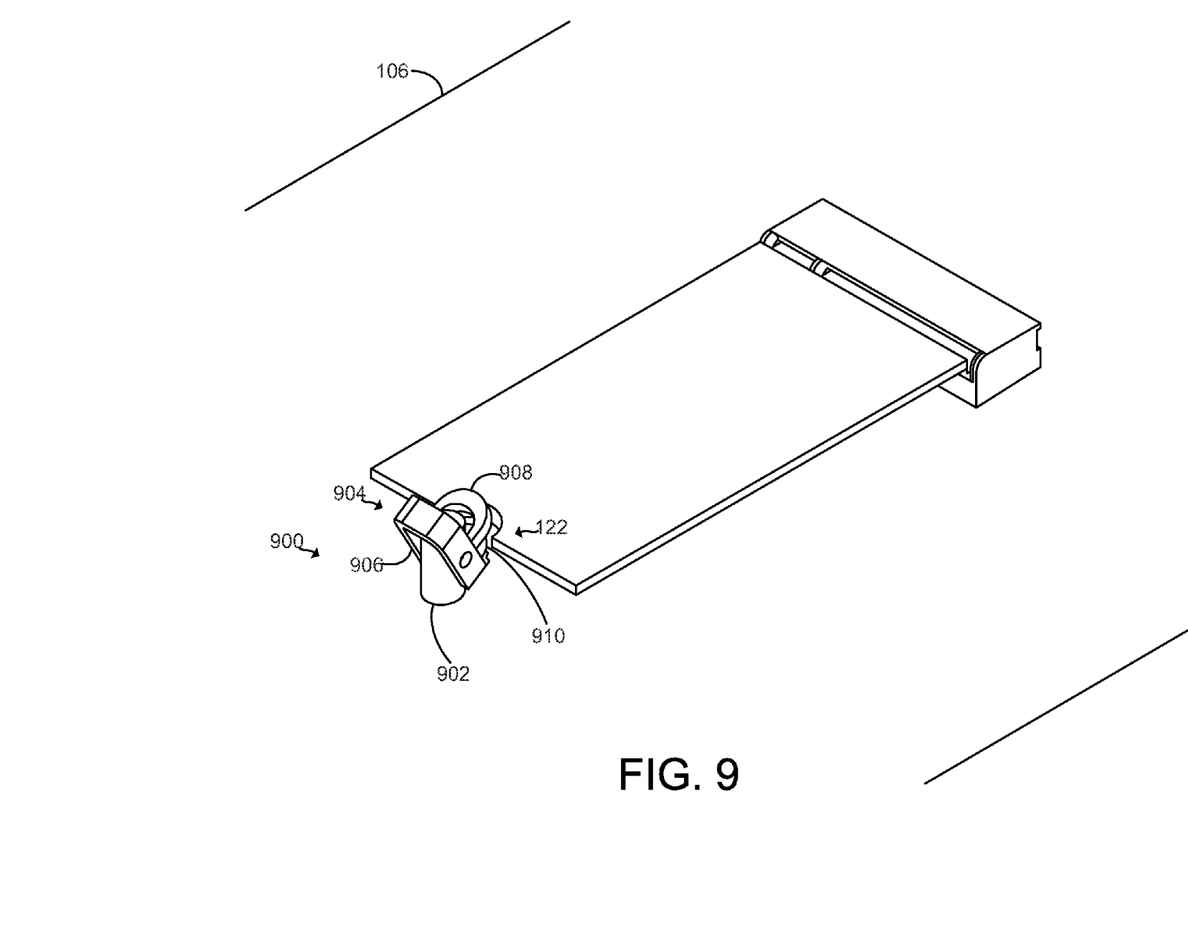
FIG. 9 is a side view of a retention assembly to secure an expansion module with a locking member at an open position, according to an example.

FIG. 9 is a side view of a retention assembly 900 to secure an expansion module with a locking member at an open position, according to an example. Retention assembly 900 may include a support member 902 and a locking member 904. Support member 902 may extend from printed circuit board 106. Support member 902 may be coupled to printed circuit board 106 via soldering.

Locking member 904 may include a body region 906. Locking member 904 may be rotatably coupled to support member 902 via body region 906. For example, a pin (not shown in FIG. 9) may enable locking member 904 to be rotatably coupled to support member 902 via respective through-holes in support member 902 and in body region 906. Locking member 904 may also include an upper flange 908 and a lower flange 910. Flanges 908-910 may extend from different parts of body region 906. Flanges 908-910 are described in more detail with reference to FIG. 10. In some examples, locking member 904 may be made from metal so that locking member 904 may act as a grounding path for expansion module 110.

During operation, locking member 904 may transition from an open position to a locked position to secure proximal end 122 of expansion module 110 via flanges 908-910. Locking member 904 at the locked position is described in more detail with reference to FIG. 11. As illustrated in FIG. 9, at the open position, upper flange 908 may not be in physical contact with proximal end 122, but lower flange 910 may be in physical contact with proximal end 122.

Figure 10:
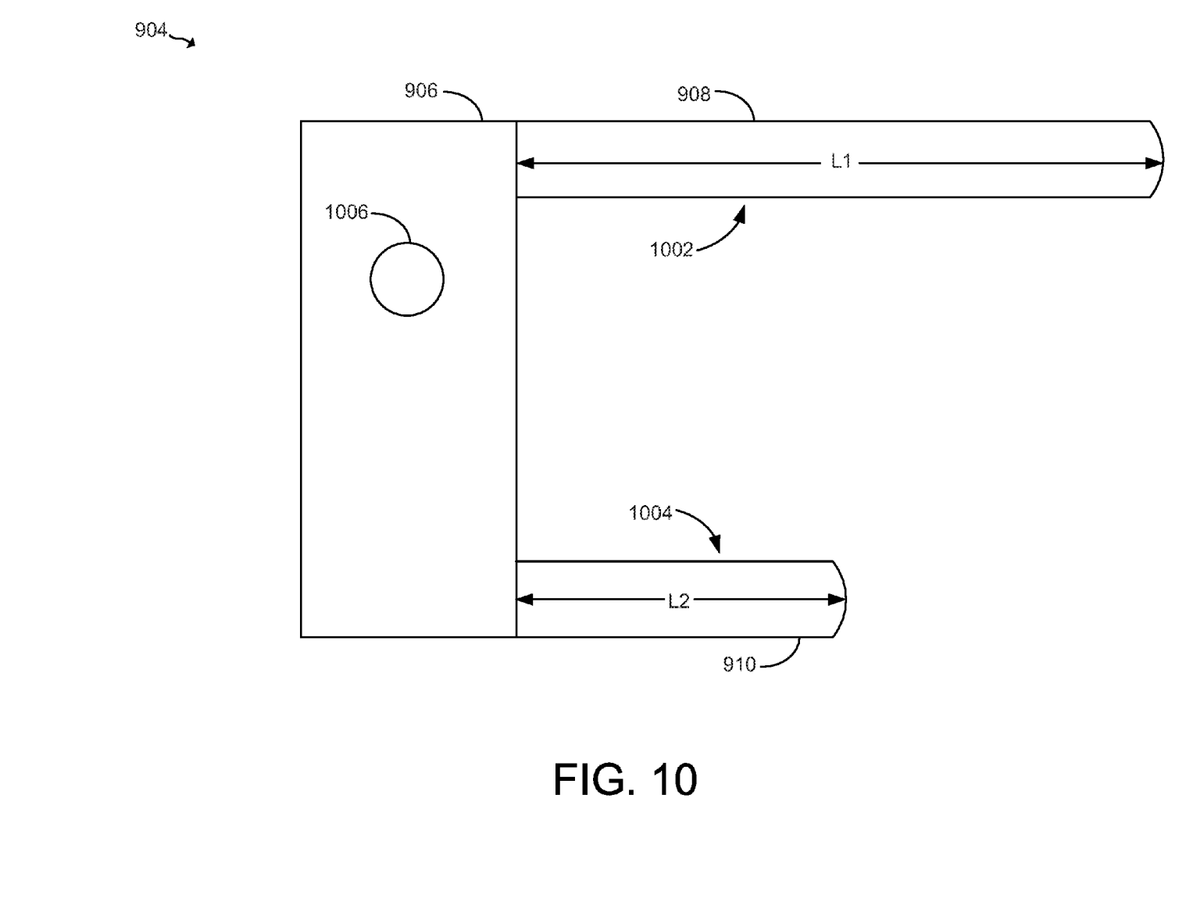
FIG. 10 is a side profile view of the locking member of FIG. 9, according to an example.

FIG. 10 is a side profile view of locking member 904 of FIG. 9, according to an example. Upper flange 908 may have a first length L1 and lower flange 910 may have a second length L2 that is less than the first length L1. A first surface 1002 of upper flange 908 and a second surface 1004 of lower flange 910 that are in physical contact with proximal end 122 may be substantially flat. Body region 906 may include a through-hole 1006 that enables a pin to couple locking member 904 to support member 902.

Figure 11:
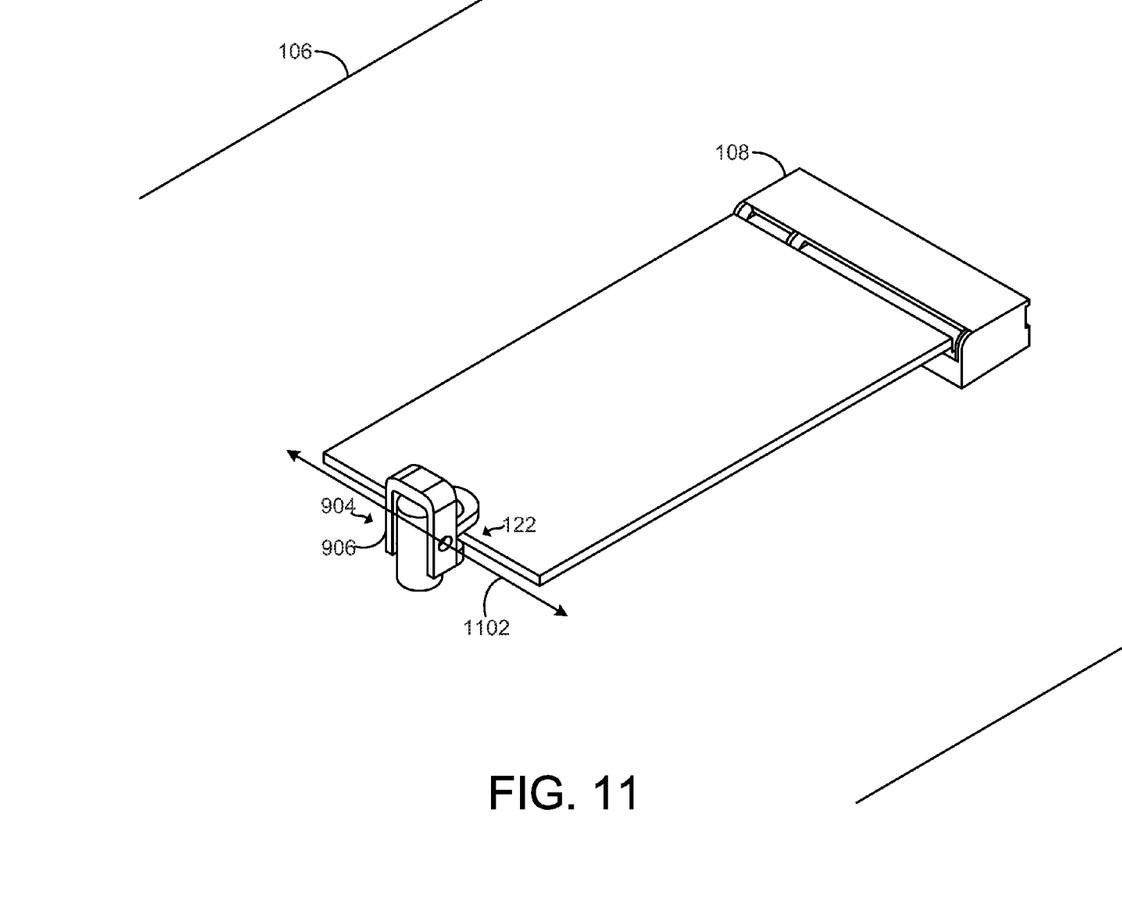
FIG. 11 is a side view of the retention assembly of FIG. 9 with the locking member at a locked position, according to an example.

FIG. 11 is a side view of retention assembly 900 of FIG. 9 with locking member 904 at a locked position, according to an example. During operation, in response to a downward force applied to body region 906 (e.g., applied by a user), locking member 904 may change from the open position to the locked position by rotating along support member 902 with respect to an axis of rotation 1102 that is perpendicular to support member 902. At the locked position, flanges 908-910 may secure proximal end 122.

Figure 12:
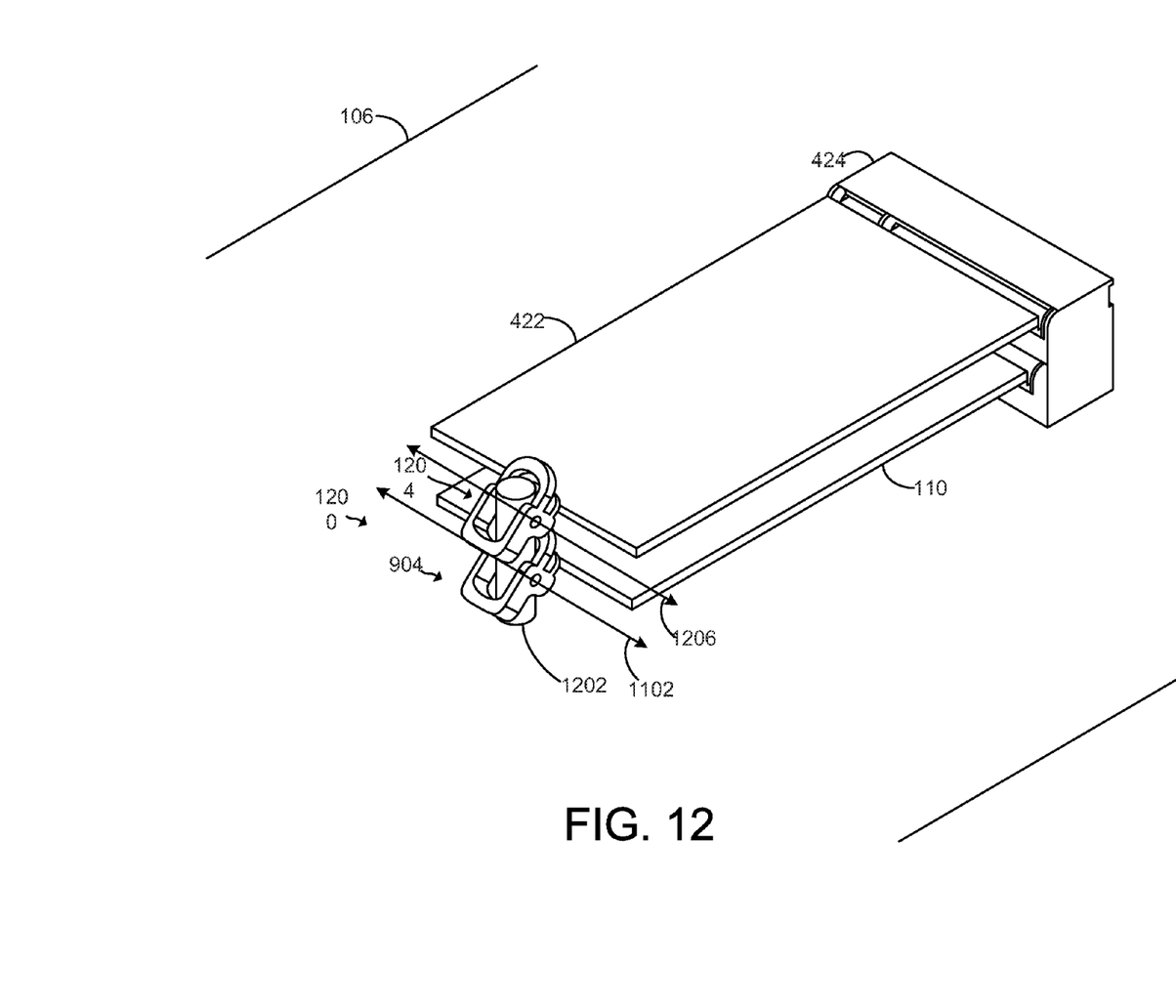
FIG. 12 is a side view of a retention assembly to secure multiple stacked expansion modules with locking members at an open position, according to an example.

FIG. 12 is a side view of a retention assembly 1200 to secure multiple stacked expansion modules with locking members at an open position, according to an example. Retention assembly 1200 may include a support member 1202, locking member 904, and a second locking member 1204. Support member 1202 may be similar to support member 902 of FIG. 9. However, support member 1202 may have a greater length than support member 902. Second locking member 1204 may be similar to locking member 904. Retention assembly 1200 may operate in a similar manner as retention assembly 900. However, retention assembly 1200 may secure multiple expansion modules, such as expansion module 110 and 422, using locking members 904 and 1204, respectively. Locking member 904 may rotate with respect to an axis of rotation 1102 and locking member 1204 may rotate with respect to a second axis of rotation 1206 that is parallel to axis of rotation 1102.

The use of "comprising", "including" or "having" are synonymous and variations thereof herein are meant to be inclusive or open-ended and do not exclude additional unrecited elements or method steps.

What is claimed is:

1. A retention assembly comprising:
   a support member extending from a printed circuit board, wherein the support member includes:
      a body region having a slot; and
      a first flange extending from the body region; and
   a locking member slidably coupled to the support member via the slot, wherein the locking member includes a second flange, wherein the second flange includes a protruded region, and wherein the protruded region and the first flange are to secure a proximal end of expansion module.

2. The retention assembly of claim 1, wherein the locking member is to change from a first position to a second position by sliding along the slot with respect to an axis parallel to the first flange, wherein the protruded region and the first flange are to secure the proximal end when the locking member is in the second position.

3. The retention assembly of claim 1, wherein the locking member further includes:
   a lower locking member including the second flange; and
   an upper locking member coupled to the lower locking member, wherein the upper locking member includes a third flange and a fourth flange, wherein the third flange includes a second protruded region, and wherein the second protruded region and the fourth flange are to secure a proximal end of a second expansion module.

4. The retention assembly of claim 3, wherein the first flange, the second flange, the third flange, and the fourth flange are in a parallel configuration.

5. The retention assembly of claim 3, wherein the lower locking member and the upper locking member are integrally formed.

6. A retention assembly comprising:
   a support member extending from a printed circuit board;
   a locking member coupled to the support member,
      wherein the locking member includes an upper flange and a lower flange,
      wherein the locking member is to change from a first position to a second position by rotating with respect to an axis of rotation perpendicular to the locking member, and wherein the upper flange and the lower flange are to secure a proximal end of an expansion module when the locking member is in the second position; and an expansion slot extending from the printed circuit board, wherein the expansion slot is to receive a distal end of the expansion module wherein the locking member further includes:

a body region, wherein the upper flange and the lower flange are to extend from the body region; and a connection region extending from the body region, wherein the connection region is coupled to the support member.

7. The retention assembly of claim 6, wherein the upper flange includes a first protruded region, wherein the lower flange includes a second protruded region, and wherein the first protruded region and the second protruded region are to secure the proximal end when the locking member is in the second position.

8. The retention assembly of claim 6, wherein the upper flange and the lower flange are in a parallel configuration.

9. The retention assembly of claim 6, further comprising a second locking member, wherein the second locking member and the locking member are in a parallel configuration.

10. A retention assembly comprising:

a support member extending from a printed circuit board; and a locking member coupled to the support member, wherein the locking member includes an upper flange and a lower flange, wherein the locking member is to change from a first position to a second position by rotating with respect to an axis of rotation perpendicular to the support member, wherein the upper flange and the lower flange are to secure a proximal end of an expansion module when the locking member is in the second position, and wherein the upper flange has a greater length than the lower flange.

11. The retention assembly of claim 10, further comprising an expansion slot, wherein the expansion slot is to receive a distal end of the expansion module.

12. The retention assembly of claim 10, wherein the locking member further includes a body region, wherein the locking member is to rotate with respect to the axis of rotation in response to a downward force applied to the body region.

13. The retention assembly of claim 10, further comprising a second locking member coupled to the support member, wherein the second locking member and the locking member are in a parallel configuration.

14. The retention assembly of claim 13, wherein the second locking member is to rotate with respect to a second axis of rotation parallel to the axis of rotation.

* * * * *